United States Patent Office.

SIGMUND ADOLF ROSENTHAL, OF LONDON, ENGLAND.

ACTIVE MATERIAL FOR SECONDARY-BATTERY PLATES.

SPECIFICATION forming part of Letters Patent No. 586,627, dated July 20, 1897.

Application filed October 15, 1896. Serial No. 608,981. (No specimens.)

*To all whom it may concern:*

Be it known that I, SIGMUND ADOLF ROSENTHAL, a subject of the German Emperor, residing at London, in the county of Middlesex, England, have invented new and useful Improvements in Active Materials for Secondary-Battery Plates, of which the following is a specification.

The "active material" or composition made according to this invention and used in connection with any suitable lead conductor to form a "plate" is very hard and porous, while firmly adhering to the conductor. The material used for making up the plate is lead oxid in the condition of a very fine powder. This material is intimately mixed with a thin solution of india-rubber, to which is added a solution of sulfate of ammonium, so as to form a stiff paste, and to this may be added, if desired, a small quantity of suitable powdered inert material—such as asbestos, slag-wool, or the like—say about five per cent. by bulk. The composition or paste is then applied to the lead conductor under compression. A suitable proportion of the rubber solution and the sulfate-of-ammonium solution is about one to eight and one to four, respectively, to the weight of the oxid of lead. When the plates are dry, they are ready for being "formed" into positives and negatives in the usual way.

The rubber solution contains about one per cent. of rubber. It fulfils two objects. First, it prevents the too quick hardening of the compound by the sulfate of ammonium contained therein and which would render the manufacture very difficult or even impossible when dealing with large quantities of the compound, and, second, it renders the plates very porous while in use.

I have found by experiments that the rubber films that remain as envelops around the particles of lead oxid after the rubber solution has dried in the plate are gradually dissolved by the usual acid exciting agent used in the battery, so that the plate after a time contains no rubber, but has become much more porous, and this is shown by a reduced resistance and an increased capacity.

What I claim, and desire to secure by Letters Patent, is—

1. An active material for secondary batteries composed of oxid of lead, a rubber binding material soluble in the usual acid exciting agent and sulfate of ammonium, substantially as set forth.

2. An active material for secondary batteries composed of oxid of lead, a rubber binding material soluble in the usual acid exciting agent, an inert substance and sulfate of ammonium, substantially as set forth.

3. A process for making secondary-battery plates, which consists in forming a paste of lead oxid and a solution of rubber, adding ammonium sulfate to harden the same, drying and "forming" substantially as described.

4. A process for making secondary-battery plates, which consists in forming a paste of lead oxid and a solution of rubber, adding an inert material and ammonium sulfate to harden the same, drying and forming substantially as described.

SIGMUND ADOLF ROSENTHAL.

Witnesses:
P. JENSEN,
E. W. ECAILLE.